United States Patent
Ku et al.

(10) Patent No.: US 11,608,938 B2
(45) Date of Patent: Mar. 21, 2023

(54) SYSTEM AND METHOD FOR REFUELING AND BACKUP POWER GENERATION

(71) Applicants: China Energy Investment Corporation Limited, Beijing (CN); National Institute of Clean-and-Low-Carbon Energy, Beijing (CN)

(72) Inventors: Anthony Ku, Fremont, CA (US); Xianming Li, Orefield, PA (US); Ashwin Ramteke, Santa Clara, CA (US); Jerad Allen Stager, Richmond, CA (US)

(73) Assignees: China Energy Investment Corporation Limited, Beijing (CN); National Institute of Clean-and-Low-Carbon Energy, Changping District (CN)

( * ) Notice: Subject to any disclaimer, the term of this patent is extended or adjusted under 35 U.S.C. 154(b) by 0 days.

(21) Appl. No.: 17/371,175

(22) Filed: Jul. 9, 2021

(65) Prior Publication Data
US 2023/0009993 A1    Jan. 12, 2023

(51) Int. Cl.
*F17C 7/04*    (2006.01)
*C25B 1/04*    (2021.01)

(52) U.S. Cl.
CPC ............... *F17C 7/04* (2013.01); *C25B 1/04* (2013.01); *F17C 2221/012* (2013.01);
(Continued)

(58) Field of Classification Search
CPC ............ F17C 7/04; F17C 2221/012; F17C 2227/0135; F17C 2265/066; C25B 1/04
(Continued)

(56) References Cited

U.S. PATENT DOCUMENTS 6,753,105 B2     6/2004  Fleck et al.
6,802,875 B1 *  10/2004  Kimbara .................. C01B 3/26
                                                                 48/85.1
(Continued)

FOREIGN PATENT DOCUMENTS

KR           102147544 B1 *  8/2020   ......... B63B 17/0027
WO     WO-2005112156 A2 * 11/2005   ......... F28D 15/0266

OTHER PUBLICATIONS

KR102147544B1, "Fuel Storage System for Hydrogen Propulsion Container Ship"—English Translation (Year: 2020).*
(Continued)

*Primary Examiner* — Timothy P. Kelly
*Assistant Examiner* — Christopher M Afful
(74) *Attorney, Agent, or Firm* — Calfee Halter & Griswold LLP (57)    ABSTRACT

A system such as a hydrogen refueling station and a method are provided. The system includes a cryotank for storing a liquefied fuel having liquid and vapor phases, a pump for providing a first stream of the liquefied fuel in the liquid phase from the cryotank, a heat exchanger for converting at least a portion of the first stream to a gaseous fuel, a dispenser for dispensing at least a portion of the gaseous fuel to a receiving fuel tank, a refrigeration unit integrated with the heat exchanger, and a backup power unit. The refrigeration unit and the heat exchanger exchange heat with each other, and the refrigeration unit provides cooling capacity to a facility of environment where cooling is needed. The backup power unit generate electric power by using a second stream of the liquefied fuel in the vapor phase or in the liquid phase or both.

25 Claims, 5 Drawing Sheets

(52) U.S. Cl.
CPC ............... *F17C 2223/0161* (2013.01); *F17C 2227/0135* (2013.01); *F17C 2227/0337* (2013.01); *F17C 2265/063* (2013.01); *F17C 2265/066* (2013.01)

(58) Field of Classification Search
USPC .................................................. 141/11, 82
See application file for complete search history.

(56) References Cited

U.S. PATENT DOCUMENTS

| | | | | |
|---|---|---|---|---|
| 2007/0181083 | A1* | 8/2007 | Fulton | G06Q 30/0225 |
| | | | | 123/3 |
| 2017/0327091 | A1* | 11/2017 | Capizzo | H02J 7/0013 |
| 2020/0158288 | A1* | 5/2020 | Li | F17C 5/06 |

OTHER PUBLICATIONS

Genevieve Saur et al.; Hydrogen and Fuel Cells for Data Center Applications Project Meeting: Workshop Report; National Renewable Energy Laboratory (NREL); Technical Report NREL/TP-5400-75355, Dec. 2019, https://www.nrel.gov/docs/fy20osti/75355.

Chayan Nadjahi et al., A review of thermal management and innovative cooling strategies for data center; Sustainable Computing: Informatics and Systems 19 (2018) 14-28; 2018 Elsevier Inc.

Eric W. Lemmon et al., REFPROP Documentation Release 10.0, National Institute of Standards and Technology (NIST), Jun. 4, 2018.

Songwut Krasae-In et al., Development of large-scale hydrogen liquefaction processes from 1898 to 2009, International Journal of Hydrogen Energy 35 (2010) 4524-4533, Elsevier doi:10.1016/j.jhydene.2010/02/109.

* cited by examiner

SYSTEM AND METHOD FOR REFUELING AND BACKUP POWER GENERATION

PRIORITY CLAIM AND CROSS-REFERENCE

None.

FIELD OF THE INVENTION

The disclosure relates to methods and systems for storing, transferring or dispensing a liquefied fuel or a pressurized gas generally. More particularly, the disclosed subject matter relates to a system or a fueling station and a method for storing and refueling hydrogen.

BACKGROUND

Many motor vehicles are currently powered by internal combustion engines with fossil fuels. Due to limited supply and adverse environmental effects associated with burning petroleum-derived fuels, vehicles are now being developed that are powered by alternative environmentally friendly fuels like hydrogen. Fuel cells can be used to produce electric power for motor vehicles by electrochemically reacting hydrogen fuel with an oxidant such as air. Other hydrogen-powered vehicles can be powered by combustion of hydrogen. Fueling or refueling hydrogen to fuel cell vehicles (FCV) and other hydrogen-powered vehicles presents different challenges from adding petroleum-based fuels like gasoline into a vehicle.

SUMMARY OF THE INVENTION

The present disclosure provides a system and a method for refueling while also providing backup power and cooling capacity. For example, the system is a hydrogen refueling station.

In accordance with some embodiments, such a system comprises a cryotank configured to store a liquefied fuel comprising a liquid phase and a vapor phase therein, a pump fluidly coupled with the cryotank and configured to provide or pump a first stream of the liquefied fuel in the liquid phase out of the cryotank, a heat exchanger, and a dispenser. The heat exchanger is coupled with the pump and configured to convert at least a portion of the first stream of the liquefied fuel in the liquid phase to a gaseous fuel. The dispenser is configured to dispense at least a portion of the gaseous fuel to a receiving fuel tank, for example, an onboard fuel tank in a vehicle. The system further comprises a refrigeration unit integrated with the heat exchanger, and a backup power unit. The refrigeration unit is configured to provide heat duty to the heat exchanger, and the heat exchanger is configured to provide cooling duty to the refrigeration unit. The refrigeration unit is configured to provide cooling capacity to a facility or environment where cooling is needed. The backup power unit is configured to receive a second stream of the liquefied fuel in the vapor phase or in the liquid phase or both from the cryotank and generate electrical power.

In some embodiments, the liquefied fuel comprises hydrogen. The system is a hydrogen refueling station. The pump is a submerged liquid pump, which is disposed inside the cryotank and configured to compress the first stream of the liquefied fuel in the liquid phase.

In some embodiments, the system further comprises a splitter, which can be disposed between the pump and the heat exchanger. The splitter is configured to split the first stream of the liquefied fuel into a first portion and a second portion. The heat exchanger is configured to convert the first portion to the gaseous fuel. The system also comprises a mixer configured to combine the gaseous fuel and the second portion to form a compressed gaseous fuel to be dispensed. In some embodiments, the gaseous fuel or the fuel to be dispensed is compressed hydrogen having a pressure in a range of from 25 MPa to 90 MPa and a temperature in a range of from −50° C. to an ambient temperature.

In some embodiments, the backup power unit is configured to receive less than 30% by weight of the total storage capacity for the liquefied fuel in the cryotank in one day when backup power is needed. The backup power unit is configured to provide the electricity power to a data center, and the refrigeration unit is configured to provide cooling capacity to the data center.

In some embodiments, the backup power unit comprises one or more fuel cells or combustion engines to generate the electrical power from the second stream of the liquefied fuel in the vapor phase (or called boil-off fuel) or the liquid phase or both. The backup power unit may be also configured to further receive at least a portion of the gaseous fuel from the heat exchanger to generate the electrical power. The combustion engine generates electricity using a thermal cycle. Suitable examples of combustion engines include, but are not limited to, a reciprocating engine, a gas turbine or microturbine.

In some embodiments, the system further comprises a liquefier fluidly coupled with the cryotank. A production unit may be fluidly coupled with the liquefier. The liquefier is configured to compress a gas generated in the production unit to the liquefied fuel. The production unit comprises at least one electrolyzer for producing hydrogen gas from water. The at least one electrolyzer or the liquefier or both may be configured to be at least partially powered by solar or wind power. Instead of a production unit, the liquefier or the cryotank may be also integrated with a liquid hydrogen distribution network, in which liquid hydrogen is transported from a storage vessel to refueling stations or use sites, for example, for industrial production (e.g., steel production).

In another aspect, the present disclosure also provides a method. Such a method is used for refueling while also providing backup power and cooling capacity. The method comprises providing a liquefied fuel having a liquid phase and a vapor phase stored inside a cryotank, pumping a first stream of the liquefied fuel in the liquid phase from the cryotank through a pump fluidly coupled with the cryotank, converting at least a portion of the first stream of the liquefied fuel in the liquid phase to a gaseous fuel through a heat exchanger coupled with the pump, and dispensing at least a portion of the gaseous fuel to a receiving fuel tank. The method further comprises providing cooling capacity from a refrigeration unit integrated with the heat exchanger to a facility in need thereof, and generating electrical power using a backup power unit using a second stream of the liquefied fuel in the vapor phase or in the liquid phase or both from the cryotank.

In some embodiments, the liquefied fuel comprises hydrogen or is hydrogen. The first stream of the liquefied fuel in the liquid phase is pumped out of the cryotank by compressing the liquefied fuel using a submerged liquid pump disposed inside the cryotank. The method may further comprise providing heat duty from a refrigeration unit to the heat exchanger, and providing cooling duty from the heat exchanger to the refrigeration unit.

In some embodiments, the method further comprises splitting the first stream of the liquefied fuel into a first portion and a second portion. The first portion goes through the heat exchanger. The method further comprises combining the gaseous fuel and the second portion to form a compressed gaseous fuel to be dispensed.

In some embodiments, less than 30% by weight of the total storage capacity for the liquefied fuel in the cryotank is provided to the backup power unit in one day when backup power is needed. The electricity power generated in the backup power unit is provided from the backup power unit to a facility such as a data center, and the cooling capacity from the refrigeration unit is used for cooling the facility such as the data center. The backup power is provided on an intermittent basis. The cooling duty can be provided on a regular daily basis.

In some embodiments, the electrical power is generated through one or more fuel cells or combustion engines in the backup power unit. The method may further comprise supplying at least a portion of the gaseous fuel from the heat exchanger to the backup power unit for generating the electrical power.

In some embodiments, the liquefied fuel in the cryotank is provided from a liquefier fluidly coupled with the cryotank. The liquefier is configured to compress a gas generated in a production unit to the liquefied fuel. For example, the production unit comprises at least one electrolyzer for producing hydrogen gas from water. The at least one electrolyzer or the liquefier or both are at least partially powered by solar or wind power in some embodiments.

The system and the method provided in the present disclosure provide many advantages as described herein. For example, in some embodiments, the present disclosure provides a hydrogen refueling station for refueling vehicles while also providing backup power and cooling capacity, for example, to a data center. Compared to a standalone storage option, the system in the present disclosure significantly reduces losses of hydrogen boil-off, which is used for generate backup power for the data center. The excessive cooling duty from the heat exchanger or vaporizer is efficiently and productively utilized. The system provides much higher cooling capability, while the heat exchanger is much more effectively used when it is integrated with a refrigeration unit.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

Unless it is expressly stated otherwise, the term "substantially" such as in "substantially the same" used herein will be understood to encompass a parameter with a fluctuation in a suitable range, for example, with ±10% or ±15% fluctuation of the parameter. In some embodiments, the range of fluctuation is within ±10%.

The system and the method described herein may be applicable to direct-fill refueling a liquefied fuel such as hydrogen. Unless expressly indicated otherwise, references to "direct-fill" (or "direct") made herein will be understood to refer to a continuous operation of a fueling or refueling process from a storage tank at a fueling station to a storage tank in a vehicle. For example, in a direct-fill system or process, liquid hydrogen can be taken from a storage tank, vaporized, and directly dispensed into a receiving tank in a vehicle. Gaseous hydrogen from the liquid state continuously flows into the receiving tank. Hydrogen is stored in the form of compressed gas in the receiving tank in a vehicle. The terms "direct-fill" and "direct" are used interchangeably with respect to a fueling or refueling process. In the existing technologies, there is an intermediate cascade storage step, where compressed gaseous hydrogen is stored after vaporization, but before dispensed into a receiving tank of a vehicle.

Unless expressly indicated otherwise, a liquefied fuel such as hydrogen is stored in a storage tank, and pumped out using a pump in liquid form. The liquefied fuel is vaporized to become a gaseous fuel in a heat exchanger. The fuel between the pump and the heat exchanger may be in a supercritical state. At least a portion of the gaseous fuel is dispensed into a receiving tank in a vehicle. In the present disclosure, the terms "fueling" and "refueling" are used interchangeably.

As used herein, when an element or component is described as forming a "connected to," "coupled to," "coupled with" or "in contact with" another element or component, it can be directly connected to, directly coupled with, in direct contact with, or intervening elements or components may be connected, coupled or in contact with the particular element or component. When an element or component is referred to as being "directly connected to," "directly coupled to," "directly coupled with," or "directly in contact with" another element, there are no intervening elements or components.

As used herein, the terms "thermally coupled to" or "thermally coupled with" used herein will be understood that the components are coupled together directly or through an intervening component so that heat can be transferred among the components, and the components may be in direct contacted with each other or the intervening component contact the components. As used herein, the terms "fluidly coupled to" or "fluidly coupled with" used herein will be understood that the components are connected with pipes or lines and configured to have gas or liquid flow through the components. As used herein, the terms "electronically connected" or "electrically connected" used herein will be understood to encompass electrical connection using wires or wireless connection.

The term "ambient temperature" used herein will be understood as a temperature under ambient conditions, for example, a room temperature of 20-22° C.

U.S. Pat. No. 6,753,105 discloses that a fuel cell system including a reservoir for a cryogenic medium such as liquid hydrogen for providing a fuel, a fuel cell unit containing at least one fuel cell connected to receive the fuel from the reservoir, a cooling circuit for cooling the fuel cell unit, and a heating circuit including at least one first heat exchanger for heating the cryogenic medium provided from the reservoir to the fuel cell unit. Waste heat from the fuel cell is used to provide energy to the heat exchanger to vaporize the cryogenic medium. This system is suitable for mobile applications where the integration of the fuel cell waste heat with the heat exchanger reduces the size and weight of the system.

U.S. Patent Application Publication No. 2020/0158288 discloses a system and a method for dispensing a liquefied gas such as hydrogen and natural gas as a fuel. The heat exchanger in the system uses only the fuel itself without external refrigeration to manage final dispensing temperature and the fueling station does not include a storage subsystem disposed between a pump and a dispenser. The heat exchanger can be a vaporizer that uses steam, gas, ambient air, or other heating source, or an electrical heater, to heat the liquefied fuel.

For these heat exchangers used in the existing fuel cell systems or refueling stations, they do not provide cooling duty or the cooling duty is lost to the environment and wasted.

The incumbent technologies that support power needs in data centers are primarily diesel generators and batteries for backup power and electricity from the grid for prime power. Hydrogen and fuel cells for data center application have been discussed, but such applications face significant technical and economical challenges. See G. Saur, et al., "Hydrogen and Fuel Cells for Data Center Applications Project Meeting: Workshop Report," Technical Report No. NREL/TP-5400-75355, Golden, Colo. (U.S.): National Renewable Energy Laboratory (NREL), 2019. For example, considerable amounts of hydrogen storage are needed. Hydrogen infrastructure on a large scale needs to be developed. The underlying technical challenges and associated prohibitively high cost are identified as barriers for the use of hydrogen fuel cells for data center applications.

Different cooling options for data centers have been reviewed in C. Nadjahi, et al., "A review of thermal management and innovative cooling strategies for data center," Sustainable Computing: Informatics and Systems, 19 (2018): 14-28. The promising cooling techniques include free cooling, liquid cooling, two-phase technologies and building envelope. Common systems use ambient air or absorption chiller to provide cooling duty. The maximum cooling capability cannot be lower than −50° C. Liquid hydrogen has not been used for data center cooling.

The present disclosure provides a system and a method for refueling while also providing backup power and cooling capacity. For example, the system is a hydrogen refueling station. Both the backup power and cooling capacity are supplied to a site or facility in need thereof such as a data center. In such a system or station, no significant storage of a liquefied fuel such as liquid hydrogen is needed. The cooling capability of liquid hydrogen can go as low as −200° C.

Combining a liquid hydrogen refueling station (LHRS) and an operation that requires cooling and backup power (e.g., data center) offers the advantage of productive use of the excess cooling duty from the LHRS, improving the effectiveness of the LH2 vaporization process over ambient air heating, and providing an effective means of storing LH2 over long periods of time without the limitations of boil-off associated with a dedicated tank for LH2 storage for backup power. The system and the method also have other significant advantages as described herein.

Figure 1:
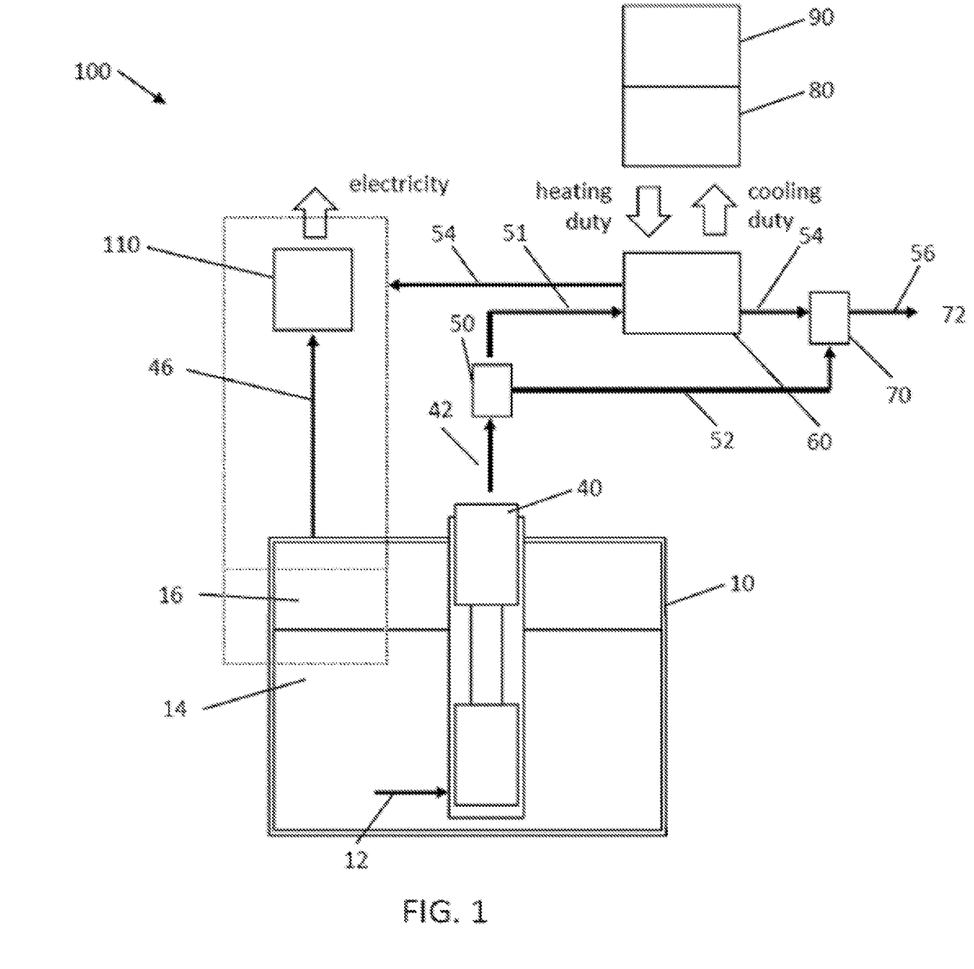
FIG. 1 is a block diagram illustrating a first exemplary system such as a hydrogen refueling station comprising a backup power generator and a refrigeration unit in accordance with some embodiments.
Figure 2:
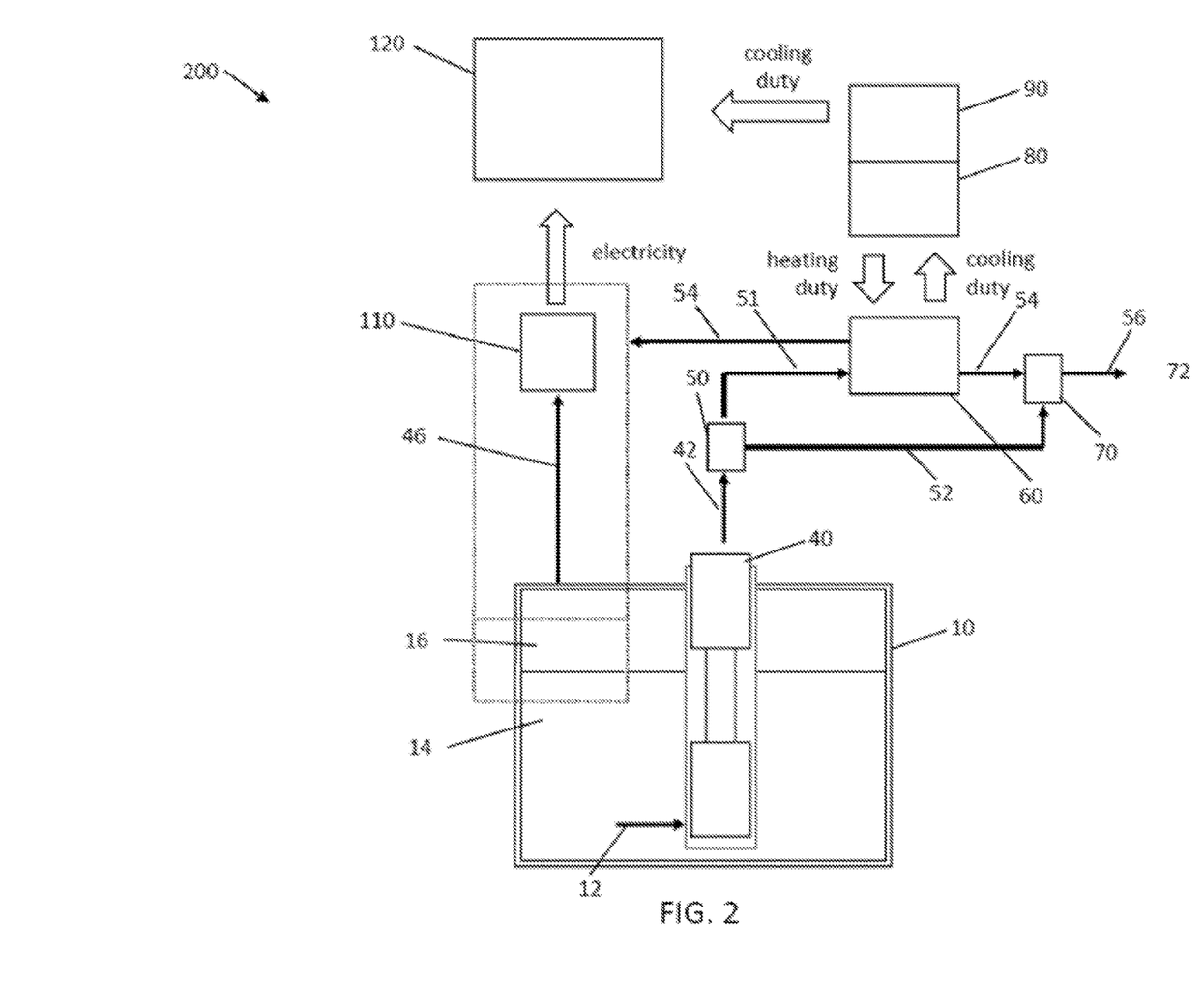
FIG. 2 is a block diagram illustrating a second exemplary system such as a hydrogen refueling station comprising a backup power generator for supplying backup power to a data center and a refrigeration unit providing cooling duty to the data center in accordance with some embodiments.
Figure 3:
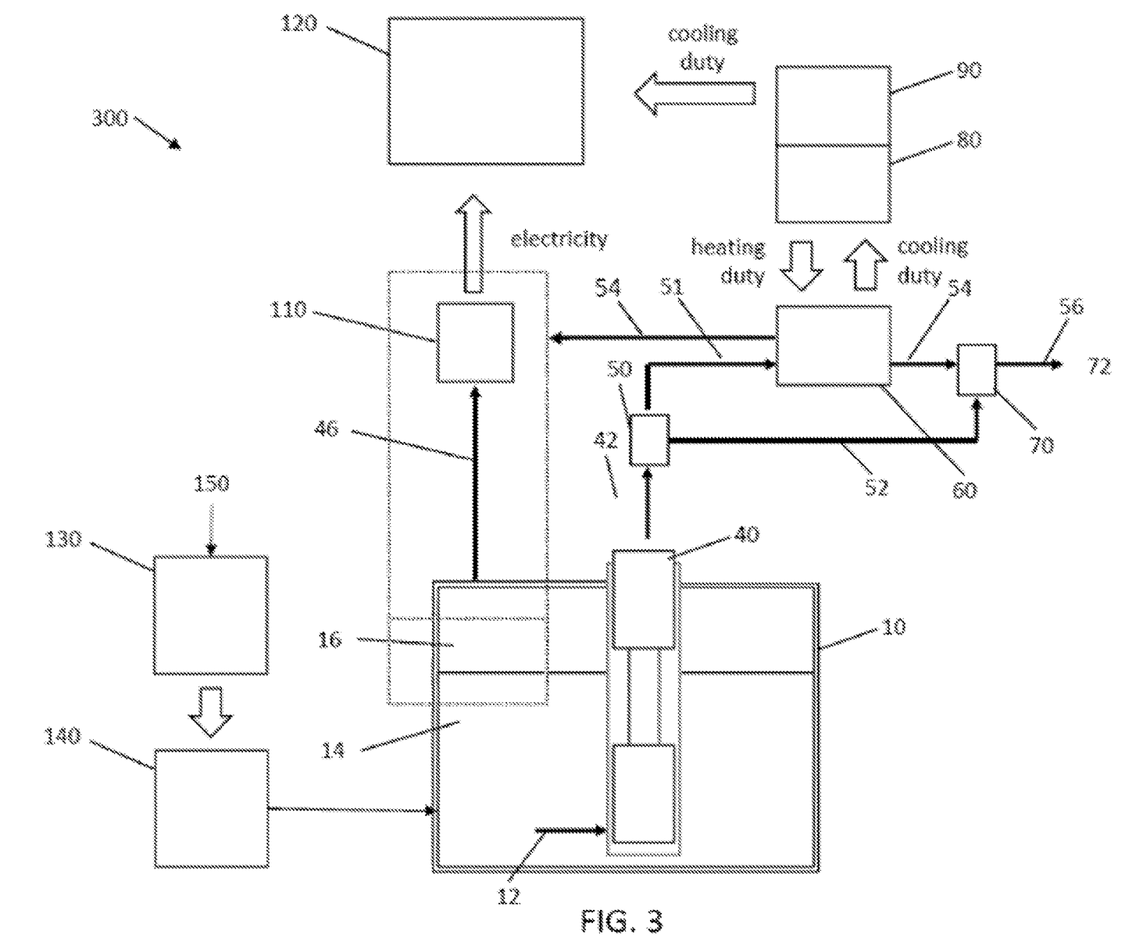
FIG. 3 is a block diagram illustrating a third exemplary system such as a hydrogen refueling station comprising a backup power generator for supplying backup power to a data center, a refrigeration unit providing cooling duty to the data center, a hydrogen production unit, and a liquefier in accordance with some embodiments.
Figure 4A:
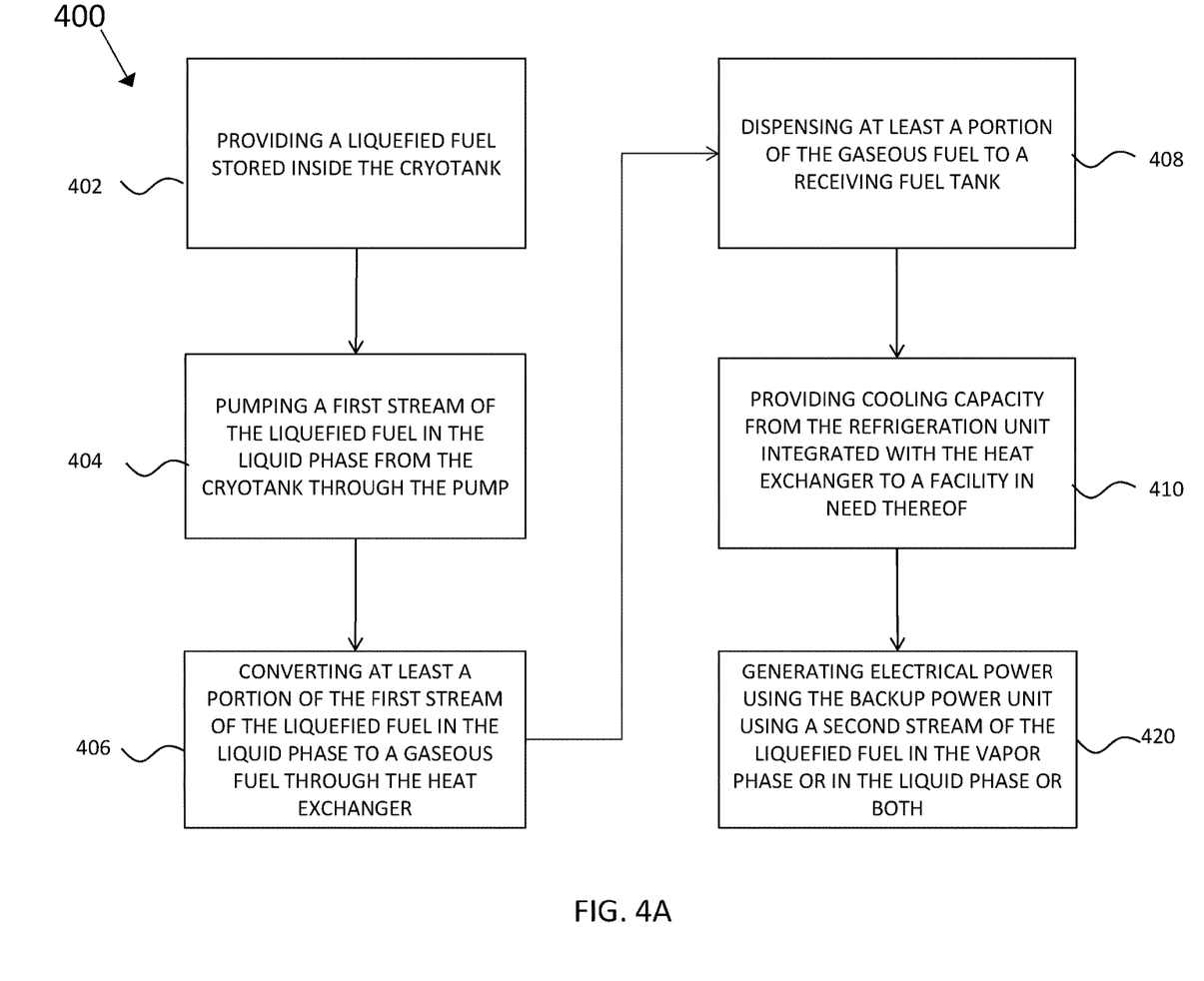
FIG. 4A is a flow chart illustrating an exemplary method comprising dispensing a liquefied fuel such as hydrogen, providing backup power, and providing cooling duty in accordance with some embodiments.
Figure 4B:
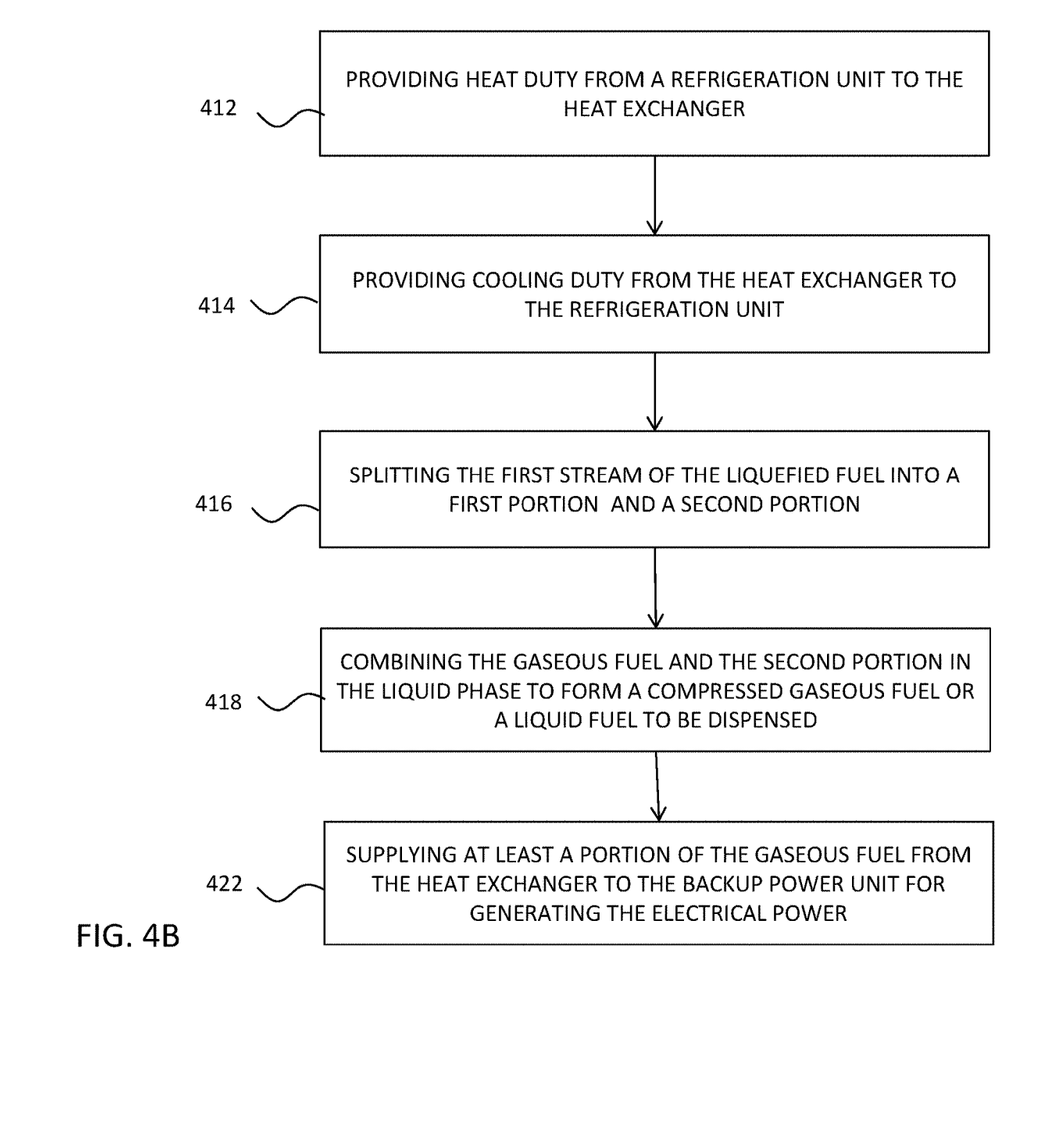
FIG. 4B is a flow chart illustrating some steps, which might be included in the exemplary method of FIG. 4A.

In FIGS. 1-3, like items are indicated by like reference numerals, and for brevity, descriptions of the structure, provided above with reference to the preceding figures, are not repeated. The method described in FIGS. 4A-4B is described with reference to the exemplary structure described in FIGS. 1-3.

Referring to FIG. 1, the exemplary system 100 comprises a cryotank 10, a pump 40, at least one heat exchanger 60, and at least one dispenser 72. The exemplary system also comprises a refrigeration unit 90, and/or a backup power unit 110.

The cryotank 10 is configured to store a liquefied fuel 12 therein. The cryotank 10 may be an insulated tank suitable for storing a liquefied fuel 12 such as liquid hydrogen at low temperature and under pressure. The liquefied fuel 12 comprising a liquid phase 14 and a vapor phase 16 (boil-off fuel). In some embodiments, the liquefied fuel 12 comprises or is hydrogen. The exemplary systems described herein are a hydrogen refueling station.

The pump 40 is fluidly coupled with the cryotank 10 and configured to provide or pump a first stream 42 of the liquefied fuel in the liquid phase out of the cryotank 10. In some embodiments, the pump 40 is a submerged liquid pump, which is disposed inside the cryotank 10 and configured to compress the liquefied fuel 12 and increase its pressure, and pump the first stream 42 of the liquefied fuel in the liquid phase out of the cryotank 10. In some embodiments, the first stream 42 is also in a supercritical state.

The heat exchanger 60, also called a vaporizer, is coupled with the pump 10 and configured to convert at least a portion of the first stream 42 of the liquefied fuel in the liquid phase to a gaseous fuel 54. The gaseous fuel 54 can be a compressed gas at a desired pressure and temperature.

The dispenser 72 is configured to dispense at least a portion of the gaseous fuel 54 to a receiving fuel tank (not shown), for example, an onboard fuel tank in a vehicle.

The refrigeration unit 90 is configured to provide heat duty to the heat exchanger 60, and the heat exchanger 60 is configured to provide cooling duty to the refrigeration unit 90. The refrigeration unit 90 is configured to provide cooling capacity to a facility or environment where cooling is needed. In some embodiments, the refrigeration unit may also include accumulator 80. Cooling duty generated by the heat exchanger 60 is used as a low temperature source for the accumulator 80 of the refrigeration unit 90. The accumulator 80, in turn, provides heating duty to the heat exchanger 60. The accumulator 80 for thermal load may include a liquid or solid medium.

The backup power unit 110 is configured to receive a second stream 46 of the liquefied fuel 12 in the vapor phase 16 or in the liquid phase 14 or both from the cryotank 10 and generate electrical power.

In some embodiments, the exemplary system 100 further comprises a splitter 50, which can be disposed between the pump 40 and the heat exchanger 60. The splitter 50 is fluidly coupled with the pump 40. The splitter 50 is configured to split the first stream 42 of the liquefied fuel into a first portion 51 and a second portion 52. The heat exchanger 60 is configured to convert the first portion 51 to the gaseous fuel 54 while the first portion 51 passes through the heat exchanger 60. The exemplary system 100 also comprises a mixer 70 configured to combine the gaseous fuel 54 and the second portion 52 to form a fuel to be dispensed. The fuel to be dispensed can be a compressed gaseous fuel or a liquid fuel. In some embodiments, the gaseous fuel or the fuel to be dispensed is compressed hydrogen having a pressure in a range of from 25 MPa to 90 MPa and a temperature in a range of from −50° C. to ambient temperature.

In some embodiments, the backup power unit 110 comprises one or more fuel cells or combustion engines to generate the electrical power from the second stream 46 of the liquefied fuel in the vapor phase (or called boil-off fuel) or the liquid phase or both. In some embodiments, the backup power unit 110 may be also configured to optionally further receive at least a portion of the gaseous fuel 54 passing through the heat exchanger 60 to generate the electrical power. The combustion engine generates electricity using a thermal cycle. Suitable examples of combustion engines include, but are not limited to, a reciprocating engine, a gas turbine or microturbine, and a hydrogen turbine.

As Example 1, the exemplary system 100 has been designed to integrate a liquid hydrogen refueling station (LHRS) having a capacity of 1 ton per day (tpd) with the cooling unit 90 and the backup power unit 110 (or subsystem).

The refrigeration unit 90 can operate continuously or non-continuously. The LHRS can, but does not necessarily, dispense $H_2$ on a continual basis. In the case where the LHRS dispenses $H_2$ on a non-continuous basis, the cooling duty can be accumulated for subsequent use by the refrigeration unit 90. This can be accomplished by cooling the accumulator 80, for example, through a liquid (or a solid block) that is stored in an insulated tank until use. The accumulator 80 can be used as a low temperature sink by the refrigeration unit 90 in a manner that is independent of the schedule during which cooling duty is delivered to the accumulator 80.

In FIG. 1, the dotted box enclosing the $H_2$ stream (i.e. the second stream 46) from the cryotank 10 and backup power unit or generator 110 indicates intermittent operation on an as needed basis for backup power. The $H_2$ extracted from the cryotank can be either gaseous or liquid. In both cases, the hydrogen needs to be warmed up to near ambient conditions. This can be done in a separate heat exchanger or integrated into the heat exchanger 60 (vaporizer). The cooling duty can be included in the cooling duty generated by the LHRS during regular operations. Alternately, the heating of the second stream of hydrogen 46 can be performed in a way that does not generate cooling load for refrigeration. In some embodiments, this is a preferred option to reduce the costs or system complexity because the backup power operation can be intermittent. The power generator can be a fuel cell, a combustion engine operated by hydrogen, or a hydrogen turbine.

Referring to FIG. 2, an exemplary system 200 is illustrated. The components for the exemplary system 200 are the same as those in the exemplary system 100, except that a data center 120 is included so that the backup power unit 110 is configured to provide the electricity power to a data center 120, and the refrigeration unit 90 is configured to provide cooling capacity to the data center 120.

The backup electrical power and the cooling capacity can be also supplied to other facilities, for example, a distribution center (e.g., for HVAC or refrigeration).

In some embodiments, the backup power unit 110 is configured to receive less than 30% (e.g., less than 20%, or less than 10%) by weight of a total storage capacity for the liquefied fuel in the cryotank 10 in one day.

As Example 2, the exemplary system 200 has been designed to integrate a liquid hydrogen refueling station (LHRS) having a capacity of 1 ton per day (tpd) with a microdata center. This system involves the integration of a LHRS that dispenses a total of 1 tpd for medium or heavy duty vehicle (MDV/HDV) refueling (at 35 MPa) and a 50 kW data center. The 1 tpd size is comparable to that of existing hydrogen refueling stations. For an example, a MDV delivery van has a tank capacity of about 10 to 20 kg. A HDV transit bus has a tank capacity of 30 to 60 kg. A 1 tpd station can service a MDV fleet of about 50 to 100 vehicles or a transit bus fleet of about 16 to 33 vehicles.

A LHRS servicing MDV vans or HDV buses needs to deliver precooled fills, which is compressed hydrogen gas at temperatures ranging from −40° C. to 0° C. The precooling offsets the heat of compression upon filling of onboard vehicle storage tanks, reducing the time needed to complete the fill. $LH_2$ is at a temperature of −253° C. (20K) to −243° C. (30K), depending on the pressure of the cryotank 10. The liquid hydrogen refueling station must supply sufficient heat to vaporize the liquid and raise the temperature of the gas to the −40° C. to 0° C. range. The combined latent and sensible heat needed to operate the station is listed in Table 1. The results were calculated using the data in NIST Reference Fluid Thermodynamic and Transport Properties Database (REFPROP).

TABLE 1

| Case | Pressure (bar) | Starting T (C.) | Ending T (C.) | Latent heat (kJ/kg) | Sensible heat (kJ/kG) | Total cooling duty available (kJ/kg) |
|---|---|---|---|---|---|---|
| 1 | 1 | −253 | −40 | 449 | 3014 | 3463 |
| 2 | 1 | −253 | 0 | 449 | 3577 | 4026 |
| 3 | 5 | −246 | −20 | 373 | 3291 | 3664 |
| 4 | 1 | −253 | 25 | 449 | 3933 | 4382 |

Required liquid hydrogen vaporization duty depends on liquid condition (the starting temperature) and the ending point temperature. For LHRS delivering −40° C. fueling, the required heat duty is 3463 kJ/kg, but this duty increases to 4382 kJ/kg for a warm ambient fill at 25° C. (Table 1). Conversely, this heat duty is also the available cooling duty when integrated with a cooling application such as a data center.

Using an illustrative value of 4000 kJ/kg, the total thermal cooling duty available from a 1 tpd station is 4 GJ/d, or 1111 $kWh_{th}$. If the energy is stored in an accumulator 80 and withdrawn at a steady rate, 46.3 $kW_{th}$ of cooling power (at temperatures of 0° C. or lower) is available on a steady basis.

Cooling loads at a data center vary based on its design. One estimate of cooling loads suggests that between 20 to 30% of the total data center power consumption is associated with the operation of cooling equipment. The availability of low temperature cooling duty would not replace the need for power to operate fans, blowers and other equipment.

Data centers vary in size and design. For example, using existing technologies, a 50 kW micro data center may include several servers, and a backup system with 5 minutes of power, followed by 24-48 hours of operation by diesel generator. Hyperscale data centers at the 20-30 MW size can contain multiple racks each designed to operate equipment with a cumulative electrical load of 30-100 kW. Backup power at a hyperscale data center is configured in a similar fashion with short-term battery power to supply UPS service, followed by diesel generators at up to 20 MW scale. At a 20-30 MW scale, a required supply of 55 tons to 130 tons of $H_2$, along with the power generation capacity to use this fuel, is needed to support 48-72 hours of backup power.

A cooling duty on the order of 57.9 kWth can improve the operation of data center operations by replacing a chiller in a refrigeration cycle. This would displace part of the electrical loads resulting in more energy efficient operation of the data center. For microdata centers, the LHRS cooling could support the entire data center. For larger data centers, the LHRS cooling duty could be integrated with a single rack. The benefits would be scalable in proportion to the relative scale of the LHRS and the data center.

For a refrigeration system or unit 90, the coefficient of performance is between 2 and 4. That means 57.9 kWth reduces the power consumption of the data center by 15 to 25 kW. Data centers report energy savings in terms of power utilization efficiency (PUE, PUE=power.total/power.IT), and the goal is to make this parameter as close to 1 as possible. Power.IT means the power used for information technologies. Integration of the refrigeration unit 90 has a direct benefit to PUE because it reduces the numerator as the power needed for cooling (P.cooling) is reduced. If 20% of the total power demand of a 50 kW data center is cooling load, it means Power.IT is 40 kW and P.cooling is 10 kW, and the PUE is 1.25. With cooling integration suggested herein, it is feasible the PUE gets to nearly 1.0, and fan and circulating pump power is the only consumption associated with cooling management in the data center.

In addition, such a refueling station (LIARS) having a capacity of 1 ton per day (tpd) is also integrated with a backup power unit 110 for a microdata center 120. The backup power demand for data centers varies depending on their size. For example, for the liquid hydrogen needed to generate power, a 50 kW microcenter data needs 75 kg/day for 2 to 3 days/year, up to about 300 kg/yr. A 20-30 MW data center would require 30 tpd for 2 to 3 days, up to about 100 t/yr. If a standalone storage tank is used, the cost of $LH_2$ storage is prohibitive because a standalone tank would suffer boil-off losses to the point where the hydrogen used productively would have an unaffordable high cost basis.

Using the systems and the method described herein, a 1 tpd refueling station needs to have a tank to accommodate daily operations. Tank capacity corresponding to several days is a design practice. An 18,000-gal tank can hold about 4000 kg of $H_2$. Withdrawing $LH_2$ from a tank of this size for the backup power operations at a 50 kW data center will cause an incremental use of less than 1% of the daily usage. A 1 tpd station can support larger backup operations, particularly in fuel cell enabled data centers, which do not require idle generation equipment because the data center racks may be powered by $H_2$. Backup power for several racks in a large scale data center could be accommodated using this station. Integration in the present disclosure offers an advantage in productive use of $H_2$ over a standalone tank for backup operations. The boil-off losses are associated with refueling applications, rather than the idle time for backup power.

Referring to FIG. 3, an exemplary system 300 is illustrated. The exemplary system 300 is the same as the exemplary system 200, except that a production unit 130 and a liquefier 140 are included.

In some embodiments, the exemplary system 300 further comprises a liquefier 140 fluidly coupled with the cryotank 10. A production unit 130 may be fluidly coupled with the liquefier 140. The liquefier 140 is configured to compress a gas generated in the production unit 130 to the liquefied fuel 12. The production unit 130 comprises at least one electrolyzer for producing hydrogen gas from water. The at least one electrolyzer or the liquefier or both may be configured to be at least partially powered by solar or wind power 150. Instead of a production unit 130, the liquefier 140 or the cryotank 10 may be also integrated with a liquid hydrogen distribution network, in which liquid hydrogen is transported from a storage vessel to refueling stations or use sites, for example, for industrial production (e.g., steel production).

As Example 3, the exemplary system 300 has been designed. A liquefaction site with 8 tpd LHRS is integrated with a hyperscale data center for cooling and backup power. The LHRS is integrated with an upstream hydrogen production and liquefaction system (i.e., the production unit 130 and the liquefier 140), and a data center 120. The data center 120 is coupled with both the refrigeration unit 90 and the backup power unit 110.

Compared to Example 2, the exemplary system 300 or Example 3 operates at a larger scale. The cryotank can hold 100 tons or more of liquid $H_2$. The upstream $H_2$ production and liquefaction occurs on a 30 tpd scale, the LHRS dispenses $H_2$ for vehicle refueling at a 8 tpd scale, and the data center uses refrigeration load at the 370 kWth scale and backup power on the 20 MW scale.

The integration in such a system offers synergistic benefits. Additional features may be included. For example, $H_2$ production can be performed at 30 tpd scale using electrolyzers powered by renewable energy (about 60 MW needed for 30 tpd). Liquefaction at multiple 30 tpd facilities can be operated at this scale. The LHRS at 8 tpd scale, using $H_2$ generated by electrolysis and with liquefaction can be performed using the exemplary system 300. This scale is envisioned for Class 8 truck fueling depots.

The exemplary system 300 can be used for hyperscale data centers at a 20 MW scale, along with potential needs for hydrogen-derived backup power. In the exemplary system 300, the data center 120 can also be configured to operate with $H_2$ for prime power. The backup $H_2$ fuel supply can be obtained from the liquefier-fed cryotank. The prime power $H_2$ fuel supply may be generated independently of the $LH_2$ supply for backup power generation, which is produced by the liquefier 140. The fuel supply for backup power is stored as $LH_2$ for intermittent use as needed, but the daily use of the $LH_2$ is for refueling applications. $LH_2$ is accumulated in the cryotank 10 over time, and the size of the cryotank permits the intermittent use of stored $LH_2$ as backup power. This arrangement overcomes the limitation in the prior art of severe boil-off losses of $LH_2$ stored as backup fuel.

The size of cryotank 10 can be determined based on the backup power requirement. In some embodiments, the flow of the second stream 46 for backup power generation is less than 20% or 10% of the total hydrogen in the cryotank 10. In some embodiments, the size of the cryotank 10 is less than 4 tons $LH_2$ (18,000 gal), which conforms to a regulatory standard. In some embodiments, the size of the cryotank is greater than 99 tons $LH_2$. The large-scale tanks can be at liquefier sites.

In accordance with some embodiments, the present disclosure provides a system, which is a hydrogen refueling station with integrated systems for refrigeration and backup power. The system or station comprises a cryotank 10 containing liquid hydrogen ($LH_2$), a liquid pump 40 configured to compress a stream of $LH_2$ from the cryotank 10, a heat exchanger 60 configured to vaporize the compressed hydrogen output from the liquid pump 40, a mixer 70, a dispenser 72, and a refrigeration unit 90. The mixer 70 is configured to combine the vaporized hydrogen output from the heat exchanger 60 with a stream of $LH_2$ from the cryotank 10 to produce a compressed hydrogen stream with a pressure between 25 and 90 MPa and a temperature between −50° C. and ambient temperature. The dispenser 72 can deliver the compressed hydrogen stream from the mixer 70 to an onboard hydrogen storage tank in the pressure range 35 to 70 MPa (inclusive) and temperatures ranging from −40° C. to an ambient temperature. The refrigeration unit 90 is integrated with the heat exchanger 60 to provide heat duty to the $LH_2$ stream and cooling duty at temperatures between −40° C. and an ambient temperature to the refrigeration unit 90. The system or station also includes a backup power unit 110 that can be powered by hydrogen from the cryotank 10. The daily hydrogen use for the backup power unit is less than 30% of the total capacity of the cryotank 10. Optionally, the refrigeration unit 90 supplies cooling capacity to a data center, and the cooling duty is at least 10% of the daily cooling duty used by the data center. Optionally, the backup power unit 110 supplies backup power to a data center 120.

Referring to FIG. 4A, an exemplary method 400 is illustrated. Such a method is used for refueling while also providing backup power and cooling capacity. FIG. 4B illustrates some steps, which may be included in the exemplary method 400.

At step 402 of FIG. 4A, a liquefied fuel 12 is provided inside a cryotank 10. The liquefied fuel 12 includes a liquid phase 14 and a vapor phase 16. In some embodiments, the liquefied fuel comprises hydrogen or is hydrogen.

In some embodiments, the liquefied fuel 12 in the cryotank is provided from a liquefier 140 fluidly coupled with the cryotank 10. The liquefier 140 is configured to compress a gas generated in a production unit 130 to the liquefied fuel 10. For example, the production unit 130 comprises at least one electrolyzer for producing hydrogen gas from water. The at least one electrolyzer or the liquefier 140 or both are at least partially, for example, at least 50%, powered by solar or wind power in some embodiments.

At step 404, a first stream 42 of the liquefied fuel 12 is pumped from the cryotank 10 through the pump 40 fluidly coupled with the cryotank 10. The first stream 42 of the liquefied fuel 12 may be in supercritical state. In some embodiments, the pump is a submerged liquid pump disposed inside the cryotank 10. The first stream 42 of the liquefied fuel 12 is pumped out of the cryotank 10 by compressing the liquefied fuel 12 using the submerged liquid pump.

At step 406, at least a portion of the first stream 42 of the liquefied fuel 12 is converted into a gaseous fuel 54 through the heat exchanger 60. The heat exchanger 60 is thermally coupled with the first stream 42 of the liquefied fuel.

At step 408, at least a portion of the gaseous fuel 54 is dispensed to a receiving fuel tank such as an onboard storage tank of a vehicle. As described herein with respect to the mixer 70, the fuel to be dispensed can be a compressed gaseous fuel or a liquid fuel. For heavy duty vehicles, light duty vehicles, and rails, the fuel is dispensed as a compressed gaseous fuel. For liquid tanks, and cyro-compressed tanks, the fuel is dispensed as liquid.

At step 410, cooling capacity is provided from the refrigeration unit 90 integrated with the heat exchanger 60 to a facility in need thereof. The cooling capacity may be provided in a form of cooling media such as cool air or fluid. The refrigeration unit 90 may be thermally coupled with the heat exchanger 60. The refrigeration unit 90 and the heat exchanger 60 may exchange heat with each other. The process in step 410 may include steps 412 and 414 of FIG. 4B. At step 412, heat duty is provided from the refrigeration unit 90 to the heat exchanger 60 to vaporize the liquefied fuel. At step 414, cooling duty is provided from the heat exchanger 60 to the refrigeration unit 90. As described above, the refrigeration unit 90 may include accumulator 80. The refrigeration unit 90 is configured to provide heat duty to the heat exchanger for converting the liquefied fuel in liquid or supercritical state to the gaseous fuel 54, and the heat exchanger 90 is configured to provide cooling duty to the refrigeration unit 90 for cooling a facility such as a data center. In some embodiments, the refrigeration unit 90 provides cooling capacity to satisfy at least 10%, for example, 10%, 20%, 30%, 40%, 50%, 60%, or 70% of the cooling load of the data center.

Referring to FIG. 4B, in some embodiments, the exemplary method 400 further comprises steps 416 and 418. At step 416, through the splitter 50, the first stream 42 of the liquefied fuel 12 is separated into a first portion 51 and a second portion 52. The first portion 51 goes through the heat exchanger 60 (i.e. vaporizer). At step 418, the gaseous fuel 54 and the second portion 52 are combined in the mixer 70 to form a fuel to be dispensed. The fuel to be dispensed can be a compressed gaseous fuel or a liquid fuel to be dispensed. In some embodiments, the fuel to be dispensed is a compressed $H_2$ stream with a pressure between 25 MPa and 90 MPa and a temperature between −50° C. and an ambient temperature. The dispenser 72 can deliver the compressed $H_2$ stream from the mixer 70 to an onboard hydrogen storage tank at a pressure between 35 MPa to 70 MPa (inclusive) and temperatures between −40° C. to the ambient temperature. The cooling duty from the heat exchanger 60 to the refrigeration unit 90 is at temperatures between −50° C. and an ambient temperature.

Referring back to FIG. 4A, at step 420, electrical power is generated in the backup power unit 110 using a second stream 46 of the liquefied fuel 12. The second stream 46 may be in the vapor phase or in the liquid phase or both from the cryotank 10. In some embodiments, after passing though the heat exchanger 60 and used for cooling, at least a portion of the gaseous fuel 54 may be also supplied to the backup power unit 110 for generating the electrical power. In some embodiments, the electrical power is generated through one or more fuel cells or combustion engines in the backup power unit 110. Suitable examples of combustion engines include, but are not limited to, a reciprocating engine, and a gas turbine or microturbine.

In some embodiments, less than 30% by weight of the total storage capacity for the liquefied fuel 12 in the cryotank 10 is provided to the backup power unit 110 over the course of a day, when backup power is needed. For example, less than 20% or 10% by weight of the liquefied fuel 12 stored in the cryotank 10 is used for backup power generation over the course of a day, when backup power is needed. In some embodiments, the electric power generated in the backup power unit 110 is provided to a data center 120. The electric power generated in the backup power unit 110 can be also supplied to other components in the system such as the refrigeration unit 90, the pump 40, the heat exchanger 60 and the dispenser 72 if additional electricity is needed. The cooling capacity from the refrigeration unit 90 is used for cooling the data center 120.

In the system and the method, the refueling process may be performed on a regular basis. The cooling duty may be generated regularly from the refueling station. The backup power may be generated on an intermittent basis.

In some embodiments, the systems provided in the present disclosure may further comprise one or more control units or a central unit (not shown in FIGS. 1-3) for controlling the steps of the method and the fuel amount in each step or going through each component. The control unit(s) may be electronically connected with the related components in the system. For example, the amount of each of the first stream 42, the second stream 46, the first portion 51 and the second portion 52 of fuel can be controlled. The amount and the ratio of the gaseous fuel 54 and the second portion 52 for mixing can be also controlled. The control unit may comprise one or more processors and at least one tangible, non-transitory machine readable medium encoded with one or more programs to be executed by the one or more processors. The control unit is configured to coordinate with each component so as to control the operation for refueling the vehicles, cooling a data center, and supplying backup power.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

The system and the method provided in the present disclosure provide many advantages as described herein. For example, in some embodiments, the present disclosure provides a hydrogen refueling station for refueling vehicles while also providing backup power and cooling capacity, for example, to a data center. Compared to a standalone storage option, the system in the present disclosure significantly reduces relative losses due to hydrogen boil-off, which is used to generate backup power for the data center. Liquid hydrogen stored in cryotank is effectively used. The excessive cooling duty from the heat exchanger or vaporizer is efficiently and productively utilized. The system provides much higher cooling capability, while the heat exchanger is much more effectively used when it is integrated with a refrigeration unit.

The tank size can be determined by the refueling operation and the backup power requirement. Boil-off may still occur due to heat leak into the tank, but with the coupling with a refueling station, the boil-off relative to productive use is very low. By way of example for illustration only, if only a back-up power unit is used, a tank may hold 10 tons of $H_2$, and lose 9 tons to boil-off over a year, leaving only 1 ton for valuable use in backup power generation. Using the systems and the method described above, a storage tank may be of the same size, but the $LH_2$ would be used for productive purposes. Assuming the tank is refilled every week, the tank will have held about 520 tons of $LH_2$ in a year. Even with the same amount of boil-off, at least 511 tons will be used for productive purposes. In addition, the boil-off loss can be further reduced if the boil-off gas is more frequently used for generating electrical power.

The system and the method also provide the benefits as follows. For example, operation of the liquid hydrogen refueling station (LHRS) is improved through more effective operation of the heat exchanger 60 (vaporizer). Heat provided by the accumulator 80 improves the operability of the heat exchanger 70. For example, a forced draft vaporizer used as heat exchanger can accumulate ice on the heat transfer surfaces due to freezing of moisture from the air. The ice layer reduces the heat transfer coefficient, leading to the need to increase the air flow through the system or adjust the controls of the LHRS. The use of active heat delivery from the accumulator 80 of the refrigeration unit 90 avoids this limitation, and expands the operating window of the LHRS.

For another example, the system and the method provide productive uses of excess cooling duty from the heat exchanger 60 during LHRS operation. The excess cooling duty from normal operation of the LHRS is used for productive cooling purposes. This reduces the net energy demand from the external cooling process.

In addition, the system and the method provide effective uses of cryotank boil-off for the LHRS operations and data center operations. The backup power unit 110 is capable of using hydrogen stored in the cryotank 10. The cryotank 10 is sized to for the LHRS operations. The cryotank 10 can be sized following general practices, for example, to include liquid hydrogen for at least 3 days of operations. For a station with a one-ton-per-day fueling capacity, a cryotank with a capacity of at least three tons of $LH_2$ is used.

Typical boil-off rates for industrial grade cryotanks are about 1%/day, indicating boil-off losses of about 40 kg/day for a tank with 4-ton capacity (18,000 gal tank). Polymer electrolyte membrane (PEM) fuel cells that are 60% efficient can generate power at a rate of 20 kWh/kg, so a daily boil-off flow of 40 kg/day could sustain an average power generation rate of 33 kW. This power can be used to support either LHRS operations, regular downstream loads from integration with other systems (e.g., refrigeration or backup power clients), or both. In cases where the relative $H_2$ demand for backup power is less than the regular daily demand, the LHRS system can be operated in parallel with the backup power generation for at least a day.

The backup power can be supplied on an intermittent basis, for example, less frequently than daily. When backup power is needed, additional $H_2$ can be extracted to supply fuel for power generation (dotted box in FIG. 1). In the example of a 4-ton capacity tank, the 30% limit corresponds to 1200 kg of $H_2$, which is capable of supporting a daily demand of up to 1.7 MW provided adequate installed fuel cell capacity. Alternately, the incremental $H_2$ withdrawals from the cryotank can be used to operate other power generation equipment including, but not limited to, combustion turbine, microturbines or reciprocating engines to generate power. The net power is dependent on the efficiency of the power conversion device. A 400 kWe hydrogen microturbine system with 40% efficiency could use 30 kg/h to produce the desired output.

The upper bound of 30% daily use of the cryotank capacity provides a window of opportunity for refilling of the cryotank 10 or restoration of primary power. For the case of data center backup, there is a requirement of 2 to 3 days backup fuel supply. In cases where an extended outage is expected, refueling operations or backup power operations can be adjusted over the course of a day or longer to optimize use of the stored $LH_2$.

As another benefit, the system and the method reduce boil-off losses of $H_2$ used for backup power relative to a standalone storage option. The storage of fuel for the system with a backup power unit 110 does not incur boil-off losses beyond the operating losses associated with the LHRS operation. Storage of $LH_2$ for a backup power unit 110 is believed to be impractical by those skilled in the art due to the high boil-off losses associated with the intermittent use profile of the backup power system as described by G. Saur et al. With intermittent backup power demand, a portion of the fuel for the backup power unit 110 would be lost as boil-off. The more infrequent the demand is, the more fuel is lost. Integration with a cryotank 10 for a LHRS, where the primary use of $LH_2$ is for refueling demand reduces the boil off losses associated with a $LH_2$-fueled backup power system.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
   a cryotank configured to store a liquefied fuel therein, the liquefied fuel comprising a liquid phase and a vapor phase;
   a pump fluidly coupled with the cryotank and configured to provide a first stream of the liquefied fuel in the liquid phase from the cryotank;
   a heat exchanger coupled with the pump and configured to convert at least a portion of the first stream of the liquefied fuel in the liquid phase to a gaseous fuel; a
   dispenser configured to dispense at least a portion of the gaseous fuel to a receiving fuel tank;
   a refrigeration unit integrated with the heat exchanger, wherein the refrigeration unit is configured to provide heat duty to the heat exchanger, and the heat exchanger is configured to provide cooling duty to the refrigeration unit; and
   a backup power unit configured to receive a second stream of the liquefied fuel in the vapor phase or in the liquid phase or both from the cryotank and generate electrical power.

2. The system of claim 1, wherein the liquefied fuel comprises hydrogen.

3. The system of claim 1, wherein the pump is a submerged liquid pump disposed inside the cryotank and configured to compress the first stream of the liquefied fuel in the liquid phase.

4. The system of claim 1, further comprising a splitter disposed between the pump and the heat exchanger and configured to split the first stream of the liquefied fuel into a first portion and a second portion, wherein the heat exchanger is configured to convert the first portion to the gaseous fuel.

5. The system of claim 4, further comprising a mixer configured to combine the gaseous fuel and the second portion to form a compressed gaseous fuel or a liquid fuel to be dispensed.

6. The system of claim 1, wherein the gaseous fuel is compressed hydrogen having a pressure in a range of from 25 MPa to 90 MPa and a temperature in a range of from −50° C. to ambient temperature.

7. The system of claim 1, wherein the backup power unit is configured to receive less than 30% by weight of a total storage capacity for the liquefied fuel in the cryotank in one day.

8. The system of claim 1, wherein the backup power unit is configured to receive no more than 20% by weight of a total storage capacity for the liquefied fuel in the cryotank in one day.

9. The system of claim 1, wherein the backup power unit is configured to provide the electricity power to a data center, and the refrigeration unit is configured to provide cooling capacity to the data center.

10. The system of claim 1, wherein the backup power unit comprises one or more fuel cells or combustion engines to generate the electrical power from the second stream of the liquefied fuel in the vapor phase or the liquid phase or both.

11. The system of claim 1, wherein the backup power unit is configured to further receive at least a portion of the gaseous fuel from the heat exchanger to generate the electrical power.

12. The system of claim 1, further comprising a liquefier fluidly coupled with the cryotank and a production unit fluidly coupled with the liquefier, wherein the liquefier is configured to compress a gas generated in the production unit to the liquefied fuel.

13. The system of claim 12, wherein the production unit comprises at least one electrolyzer for producing hydrogen gas from water, and the at least one electrolyzer or the liquefier or both configured to be at least partially powered by solar or wind power.

14. A method, comprising:
providing a liquefied fuel stored inside a cryotank, the liquefied fuel comprising a liquid phase and a vapor phase;
pumping a first stream of the liquefied fuel in the liquid phase from the cryotank through a pump fluidly coupled with the cryotank;
converting at least a portion of the first stream of the liquefied fuel in the liquid phase to a gaseous fuel through a heat exchanger coupled with the pump;
dispensing at least a portion of the gaseous fuel to a receiving fuel tank;
providing cooling capacity from a refrigeration unit integrated with the heat exchanger to a facility in need thereof; and
generating electrical power in a backup power unit using a second stream of the liquefied fuel in the vapor phase or in the liquid phase or both from the cryotank.

15. The method of claim 14, wherein the liquefied fuel comprises hydrogen.

16. The method of claim 14, wherein the first stream of the liquefied fuel in the liquid phase is pumped from the cryotank by compressing the liquefied fuel using a submerged liquid pump disposed inside the cryotank.

17. The method of claim 14, further comprising providing heat duty from the refrigeration unit to the heat exchanger; and providing cooling duty from the heat exchanger to the refrigeration unit.

18. The method of claim 14, further splitting the first stream of the liquefied fuel into a first portion and a second portion, wherein the first portion goes through the heat exchanger.

19. The method of claim 18, further comprising combining the gaseous fuel and the second portion to form a compressed gaseous fuel or a liquid fuel to be dispensed.

20. The method of claim 14, wherein less than 30% by weight of a total storage capacity for the liquefied fuel in the cryotank is provided to the backup power unit in one day when backup power is needed.

21. The method of claim 14, wherein electricity power is provided from the backup power unit to a data center, and the cooling capacity from the refrigeration unit is used for cooling the data center.

22. The method of claim 14, wherein the electrical power is generated through one or more fuel cells or combustion engine in the backup power unit.

23. The method of claim 22, further comprising supplying at least a portion of the gaseous fuel from the heat exchanger to the backup power unit for generating the electrical power.

24. The method of claim 14, wherein the liquefied fuel in the cryotank is provided from a liquefier fluidly coupled with the cryotank, wherein the liquefier is configured to compress a gas generated in a production unit to the liquefied fuel.

25. The method of claim 24, wherein the production unit comprises at least one electrolyzer for producing hydrogen gas from water, and the at least one electrolyzer or the liquefier or both are at least partially powered by solar or wind power.

* * * * *